US006902226B1

(12) United States Patent
Taylor

(10) Patent No.: US 6,902,226 B1
(45) Date of Patent: Jun. 7, 2005

(54) MULTI-COMPARTMENT SEMI-TRAILER FOR TRANSPORT OF RECYCLABLE MATERIALS

(76) Inventor: William S. Taylor, P.O. Box 148, Baxter, KY (US) 40806

( * ) Notice: Subject to any disclaimer, the term of this patent is extended or adjusted under 35 U.S.C. 154(b) by 0 days.

(21) Appl. No.: 10/814,684

(22) Filed: Mar. 31, 2004

Related U.S. Application Data

(63) Continuation-in-part of application No. 10/737,564, filed on Dec. 16, 2003.

(51) Int. Cl.[7] ............................................. B62D 33/04
(52) U.S. Cl. ............................. 296/182.1; 296/183.1; 296/186.4
(58) Field of Search .......................... 296/182.1, 183.1, 296/186.1, 186.4; 414/373; 105/239, 240, 105/276, 279, 235, 258, 377.1

(56) References Cited

U.S. PATENT DOCUMENTS

| | | | | |
|---|---|---|---|---|
| 2,711,343 A | * | 6/1955 | Falk et al. ................ | 296/186.4 |
| 4,140,339 A | * | 2/1979 | Fredin .................... | 296/100.17 |
| 4,268,084 A | * | 5/1981 | Peters .......................... | 296/148 |
| 4,489,975 A | * | 12/1984 | Fredin ..................... | 296/186.4 |
| 4,690,609 A | * | 9/1987 | Brown ..................... | 296/186.4 |
| 5,488,911 A | | 2/1996 | Riggin | |
| 6,079,762 A | * | 6/2000 | Strasser ....................... | 296/36 |
| 6,309,164 B1 | | 10/2001 | Holder et al. | |
| 6,695,390 B2 | * | 2/2004 | Bucco Morello ........... | 296/36 |
| 2002/0158488 A1 | * | 10/2002 | Sugimoto ................... | 296/147 |

* cited by examiner

*Primary Examiner*—Lori L. Coletta
(74) *Attorney, Agent, or Firm*—Pitts & Brittian, P.C.

(57) ABSTRACT

A semi-trailer for transporting salvageable materials is disclosed including a platform having multiple compartments thereon. A first sidewall extends along a platform first side and is supported by front and rear end walls and a partition wall spaced apart between the platform end walls. A second sidewall is pivotably mounted for movement between a closed position along a platform second side, and a raised position for side loading of materials when the semi-trailer is stationary. The second sidewall is supported by forward, middle, and rear upper segments extending laterally above the platform. Each upper segment is pivotably connected to upper portions of the first sidewall to provide clamshell movement of the second sidewall above the platform. A lifting mechanism includes a plurality of lifting cylinders positioned proximal of front and rear end walls and the partition wall for raising the second sidewall to provide unhindered side access to each compartments.

24 Claims, 6 Drawing Sheets

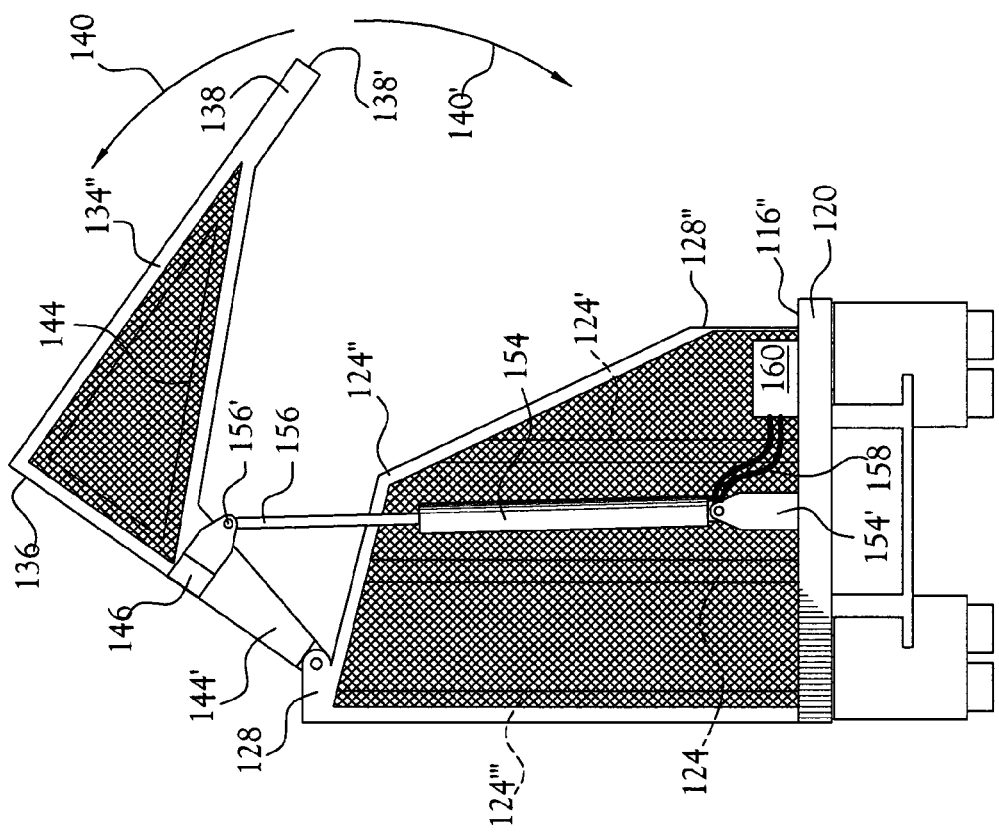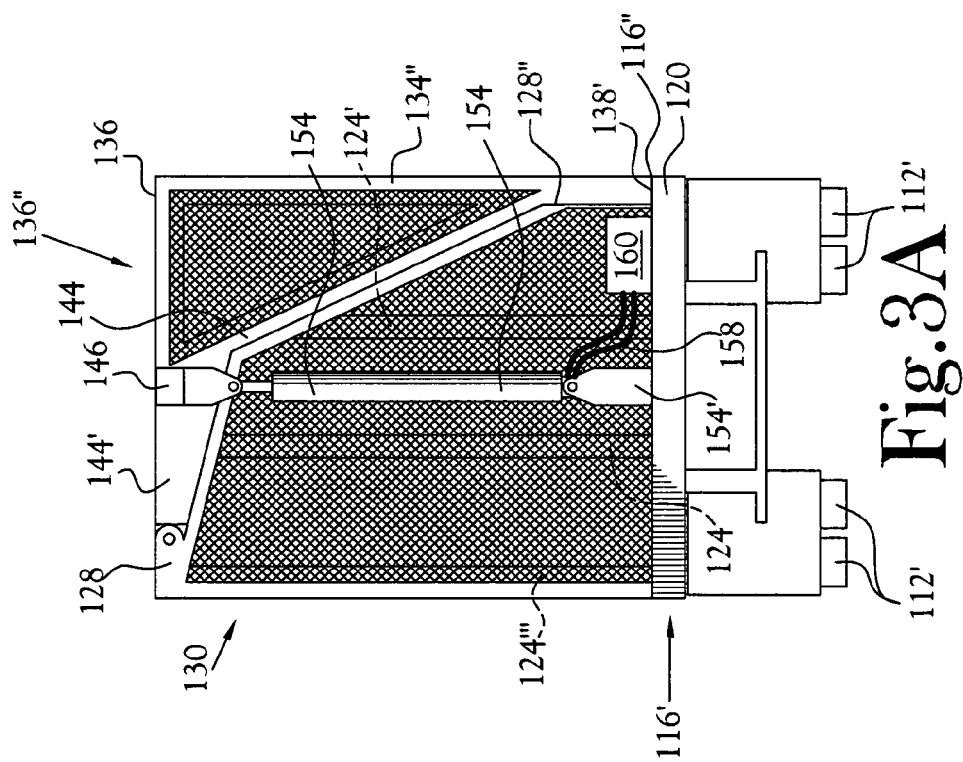

MULTI-COMPARTMENT SEMI-TRAILER FOR TRANSPORT OF RECYCLABLE MATERIALS

CROSS REFERENCE TO RELATED APPLICATIONS

This application is a continuation-in-part application of application Ser. No. 10/737,564, filed Dec. 16, 2003.

STATEMENT REGARDING FEDERALLY SPONSORED RESEARCH OR DEVELOPMENT

Not Applicable.

BACKGROUND OF THE INVENTION

1. Field of Invention

This invention pertains to transport vehicles for moving recyclable materials long distances. More particularly, this invention pertains to a semi-trailer for contained transport of salvageable vehicles and bulky recyclable materials.

2. Description of the Related Art

As prices for recyclable salvage materials escalate, salvage materials are being transported over significantly greater distances on public roads. Prior transport vehicles include flat-bed trucks and semi-trailers lacking walls on which crushed vehicle bodies and other bulky recyclable materials are stacked and secured by chains and cables. Due to the increasing frequency of mishaps involving damage to public vehicles by ejection of debris from flat-bed trucks and semi-trailers lacking side walls, the U.S. Department of Transportation has developed regulations requiring transport of salvageable vehicles to be contained by a transport vehicle having side walls when moved on public roads.

Prior methods of transport of refuse and recyclable materials over short distances in local communities include trucks having individual hoppers accessible from a perimeter of the vehicle, or dump trucks having an open bay in which materials were dumped by auxiliary equipment (see U.S. Pat. No. 6,309,164). For long distance transport of refuse and recyclable materials, dump trucks have typically been utilized with no covering over the materials. The above described vehicles are typically not adequately sized to accept crushed vehicles or other bulky recyclable materials that are efficiently loaded and unloaded utilizing a forklift system and/or an overhead crane system. Flat-bed rail cars have been utilized for transport of refuse and recyclable materials contained in boxes mounted on the flat-bed rail cars, or flat-bed rail cars have been utilized to transport crushed vehicles stacked and secured by chains or straps thereon. Typical rail cars utilized for hauling refuse have included cars having four side walls and an enclosing top wall, with one or opposed side doors being slid sideways to provide a side opening for loading and unloading of refuse. For typical rail cars which utilize a side door rigidly attached to a covering top wall, when the side door and top wall are opened, the side door is limited in movement therefore obstruction of the side door opening occurs (see U.S. Pat. No. 5,488,911). Further, an enclosing top wall for a rail car does not allow overhead access for loading and unloading of the rail car contents from overhead by a crane.

An improved transport vehicle is needed to meet federal regulations for containment of salvageable vehicles and other bulky recyclable materials during towed transport. Further, an improved semi-trailer transport vehicle is needed to provide compartments for containment of salvageable vehicles segregated from other recyclable materials during towed transport of the semi-trailer while offering efficient loading and unloading of salvageable vehicles and other recyclable materials due to unobstructed side access or unobstructed overhead access with a minimum of movement of sidewalls. In addition, a semi-trailer is needed having reduced trailer weight while maintaining trailer platform rigidity in order to increase carrying capacity for salvageable materials stored in compartments on the semi-trailer.

BRIEF SUMMARY OF THE INVENTION

According to one embodiment of the present invention, a semi-trailer is provided for transporting salvageable materials to one or more processing facilities. The semi-trailer includes a platform having multiple compartments thereon and supported by a wheeled undercarriage for towed transport. The platform includes a first sidewall extended along a first side and a second sidewall extended along a second side of said platform, with each sidewall having upper portions extended upwardly to bound an open top of sufficient width separation to receive salvageable materials therein. Front and rear end walls are extended between the first and second sidewalls, and a partition wall is spaced apart between the front and rear end walls, with the partition wall being oriented for separation of the platform into a forward compartment and a rearward compartment.

The second sidewall is mounted for clamshell movement between a closed position aligned along the second side of the platform and substantially parallel with the first sidewall, to a raised position above the platform. The second sidewall includes front and rear upper support segments extended laterally across the platform width. Each front and rear upper support segment is disposed laterally adjacent with respective front and rear end walls. Each support segment includes respective front and rear connecting ends pivotably mounted to respective front and rear upper portions of the first sidewall. The second sidewall also includes a middle upper support segment extended laterally from a middle of the second sidewall and is positioned adjacent the partition wall on the platform.

A lifting mechanism is utilized for movement of the second sidewall from the closed position to a raised position above the platform. Movement to the raised position provides unobstructed side access to either of the forward and rearward compartments for loading and unloading of salvageable materials. Movement to the closed position provides for containment and segregation of salvageable materials during towed transport to processing facilities.

With the second sidewall positioned in the closed position, the separation between each first and second sidewall provides each compartment with an open top of sufficient width and length to receive salvageable materials in either compartment from an overhead delivery mechanism. In order to reduce the unloaded weight of the semi-trailer and thereby increase the load capacity for transport of salvageable materials during each trip, the first sidewall, the front and rear end walls, and the second sidewall include lightweight materials extending between upper and lower frame members and having a plurality of spaced-apart studs extending upwardly relative to the platform when the second sidewall is in the closed position. The first sidewall, the front and rear end walls, and the second sidewall further include generally continuous exterior surfaces which are composed of a mesh material supported by the plurality of spaced-apart studs, with the mesh material allowing air flow therethrough during transport and providing a lesser unloaded weight for the platform in comparison to solid metal sidewalls and end walls. Loose salvageable materials generated during loading or transport are retained within the respective compartments regardless of air flow through the compartments during towed transport thereby protecting other vehicles traveling near the platform during towed transport over public roads.

BRIEF DESCRIPTION OF THE SEVERAL VIEWS OF THE DRAWINGS

The above-mentioned features of the invention will become more clearly understood from the following detailed description of the invention read together with the drawings in which:

FIG. 3A is a rear view of FIG. 1, illustrating the movable sidewall in a closed position with a rear lifting mechanism disposed in a non-extended position;

FIG. 3B is a rear view of FIG. 3A, illustrating the movable sidewall in the elevated position with the rear lifting mechanism in an extended position;

DETAILED DESCRIPTION OF THE INVENTION

Figure 1:
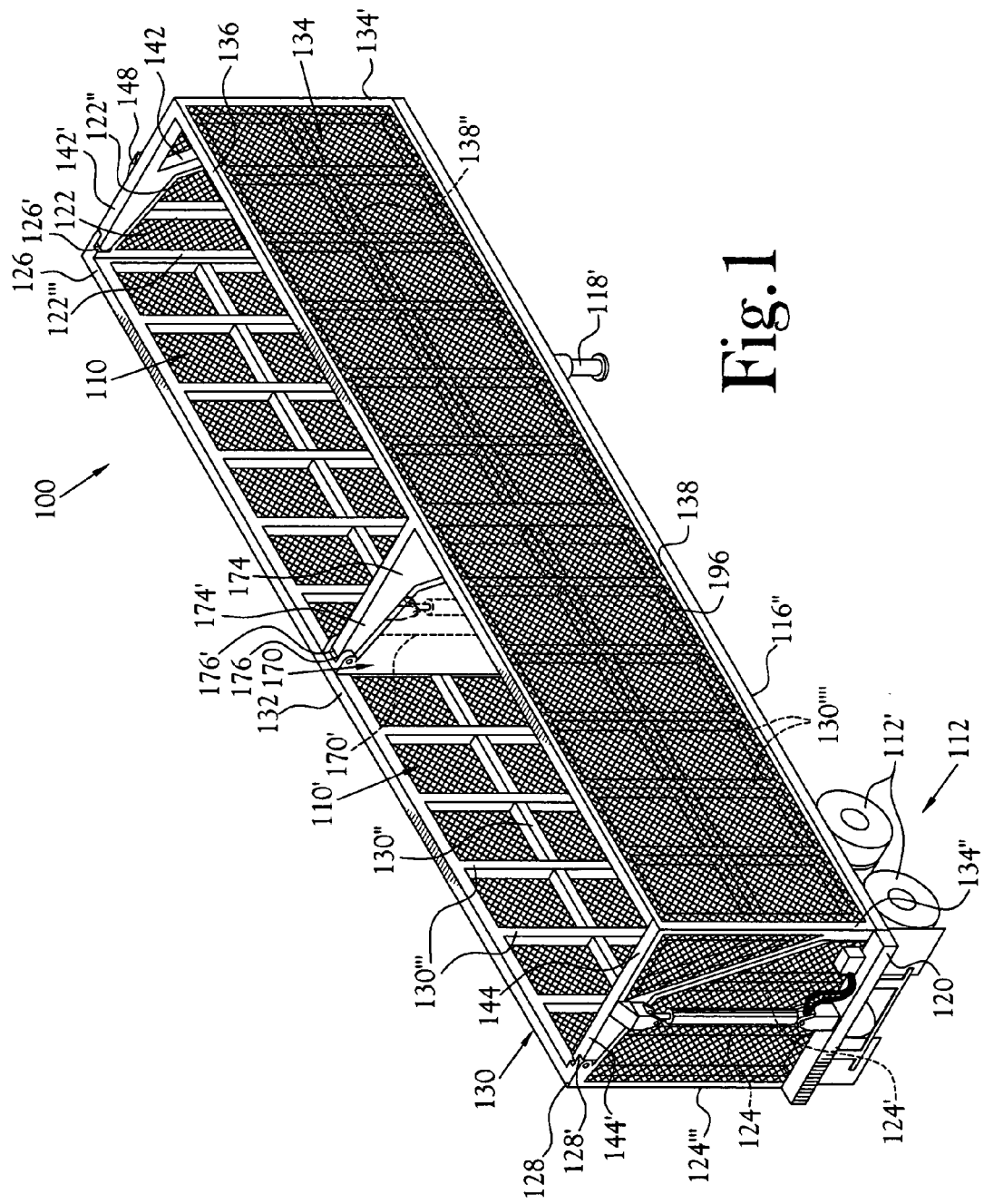
FIG. 1 is a perspective view of a semi-trailer of the present invention having multiple compartments in which salvageable materials are segregated.

In accordance with the present invention, a semi-trailer 100 having multiple storage compartments 110, 110' is provided for contained transport of salvageable materials such as crushed vehicles 192, 192', 192" and other bulk recyclable materials 194 to processing facilities. Unobstructed side access is provided to the storage compartments 110, 110' by mounting a pivotable second sidewall 134 for clamshell movement between a closed position 140' and a raised position 140 above the platform 116. With the pivotable sidewall 134 in the closed position, the semi-trailer 100 is towed by connection to a tractor-truck sized to provide adequate towing capacity of up to about a twenty ton load capacity for the platform 116 mounted on a multi-wheeled undercarriage 112 (see FIGS. 1 and 2). The platform 116 includes an adequate width between a first side 116' from a second side 116" for positioning thereon a plurality of crushed vehicles 192, 192', 192", either through an open top 136' with the pivotable sidewall 134 closed, or by side access along the second side 116" with the pivotable sidewall 134 raised (see FIGS. 1 and 2).

Figure 2:
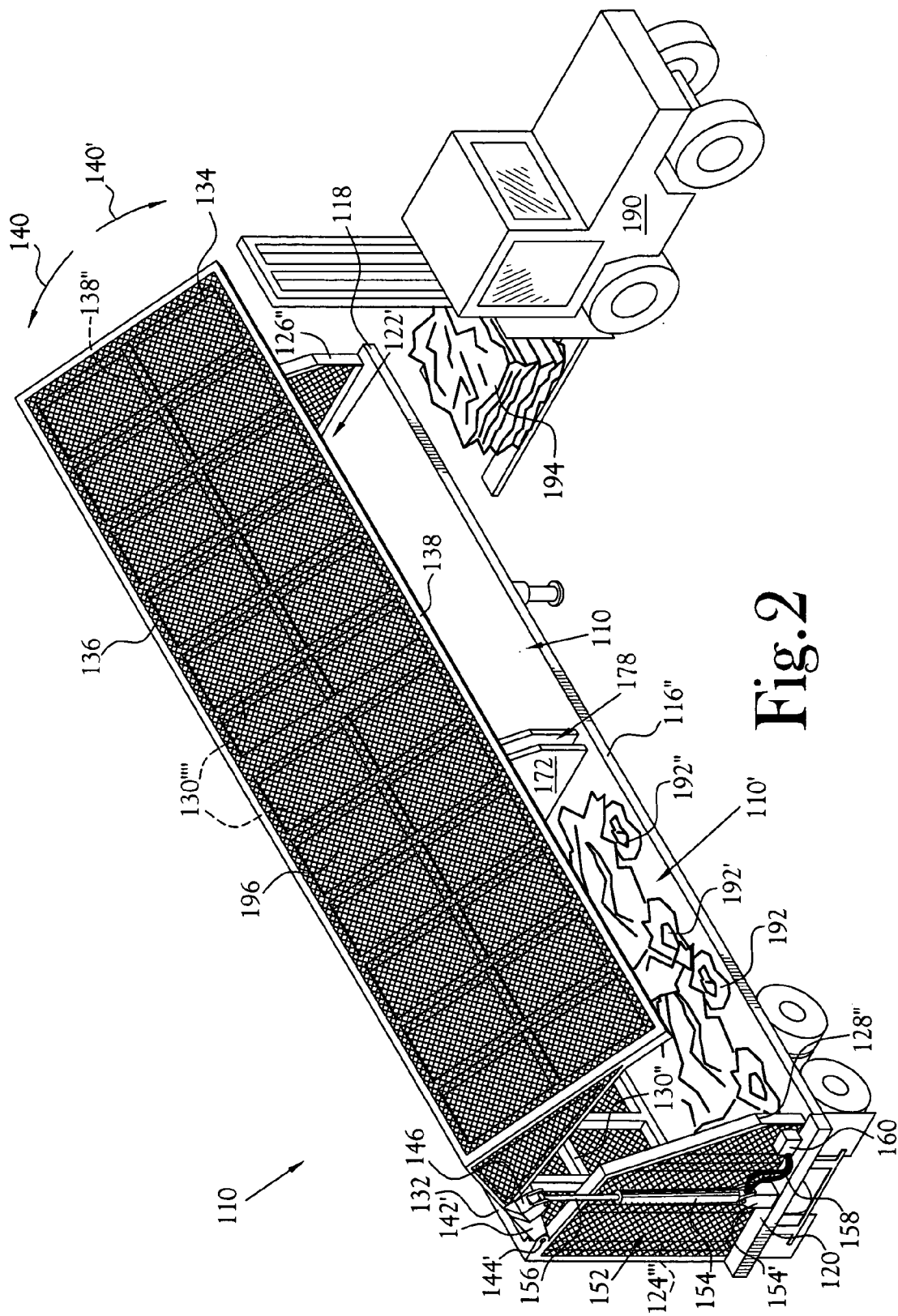
FIG. 2 is a perspective view of FIG. 1, illustrating the movable sidewall in a raised position for side loading into either compartment of the semi-trailer.

In order to retain size-reduced recyclable materials on or in a semi-trailer 100 during transport over public roads, a fixed first sidewall 130 forms a first containment wall extending vertically along the length of the platform first side 116' from a front end 118 to a rear end 120 (see FIGS. 2 and 3A). The first sidewall 130 is extended for a height above the platform 116 of between about 8 feet 6 inches, for a total height above the ground of about 13 feet 6 inches in one embodiment. The height of the first sidewall 130 is constructed to be an adequate height above the platform 116 to retain the flattened profiles of each upper-most stacked crushed vehicle 192, 192' or 192", at a height of approximately equal to, or lower than, the height of a lengthwise oriented upper frame 132 of the first sidewall 130. The platform 116 further includes a fixed front end wall 122 and a fixed rear end wall 124 aligned generally parallel with each other and spaced apart a sufficient length to accommodate therebetween a plurality of recyclable materials in various shapes. An end-to-end platform length extending between end walls 122, 124 is about forty feet to about forty-one feet. The front end wall 122 and rear end wall 124 are joined along respective base portions to the platform 116. Rigid corner studs are required to support the pivoting ends of the second sidewall 134, including a wall front corner member 122'" and a rear corner member 124'" positioned at respective front and rear corners of a lower frame 132' of the first sidewall 130. The upper frame edges 122", 124" of the mid-portion of respective front and rear end wall support studs 122, 122", 124, 124' are angled downwards toward the platform second side 116", thereby providing a lower height threshold for lifting salvageable materials over either front or rear end wall support studs 122, 122", 124, 124' when loading or unloading across the platform second side 116" by a forklift 190 (see FIG. 2) or other lifting and loading device. The first sidewall 130 and substantially upright wall support studs 122, 122", 122'", 124, 124', 124'" are positioned as a plurality of steel or aluminum support members 130'", 130"" spaced apart along each sidewall and platform ends, to provide rigid containment walls for recyclable materials stacked on the platform 116. Two open tops 136', 136" are provided to allow a plurality of crushed vehicles 192, 192', 192" and/or other recyclable materials 194 to be loaded or unloaded into either or both storage compartments 110, 110' from overhead by appropriate equipment positioned proximal of the platform 116 with the second sidewall 134 in a closed position 140'.

During towed transport of the semi-trailer 100, the pivotable second sidewall 134 is positioned in a closed position 140' in which a base frame member 138 is disposed adjacent the length of the platform second side 116", and the second sidewall 134 is extended substantially parallel to the first sidewall 130 (see FIGS. 1 and 3A). The second sidewall 134 is pivotably disposed to a raised position 140 above the platform 116 (see FIGS. 2, 3B, 6B and 7), by at least one lifting mechanism 150 powered in one embodiment by a hydraulic power system including one rear motor 160 and/or a front motor 160' which are controlled by an operator when the semi-trailer 100 is stationary. One skilled in the art will recognized that the lifting mechanism 150 can include a hydraulic system that is pressurized by power generated by the engine of a tractor-truck, or the lifting mechanism 150 can include a pneumatic air system that is supplied by a pressurized system utilized by a tractor-truck designed to pull a semi-trailer.

The second sidewall 134 includes an upper frame 136 extended between an upper corner of an upper front support segment 142 and an upper corner of an upper rear support segment 144. When in the closed position 140', the upper front support segment 142 has a pivot connector end 142' extended adjacently parallel above the front end wall 122, and the upper rear support segment 144 has a pivot connector end 144' extended adjacently parallel above the rear end wall 124. Both connector ends 142', 144' are configured to extend laterally about eight feet to traverse the platform width and to connect pivotably at respective front and rear pivot junctions 126', 128' proximal of the upper front and rear corners of the first sidewall 130. When in the raised position 140, the movable front support segment 142 is raised into a cantilevered position above the front end wall 122, and the movable rear support segment 144 is raised into a cantilevered position above the rear end wall 124, thereby providing unobstructed access for loading and unloading of either the front and rear storage compartments 110, 110'.

In order to reduce the unloaded weight of the semi-trailer 100 thereby increasing the capacity for recyclable materials, the outer surfaces 196 of the first sidewall 130, the pivoting sidewall 134, and the front and rear wall segments 122, 142, 124, 144, can be composed of a mesh or lattice material allowing air flow therethrough. By utilizing a mesh or lattice material covering the first sidewall, the front and rear end walls, and the pivoting sidewall 134, the gross weight of the semi-trailer 100 is reduced by approximately 5,000 pounds, while retaining structural integrity of the side walls by utilizing a plurality of spaced-apart studs 130''', 130'''' to support the mesh or lattice materials. Typical materials utilized for the outer surfaces 196 include a fabric tarp, a high-density plastic mesh, or a lattice material composed of steel, aluminum or synthetic polymer materials. The outer surfaces 196 of the mesh or lattice materials are supported by a plurality of spaced-apart studs 130''', 130'' '' positioned between the major sidewall structural support members of the semi-trailer 100 including corner support members 122''', 124''', 126, 128, and cross-member supports 142', 144', 174' (discussed herein). A sidewall support member at the front corner 126 and back corner 128 of the first sidewall 130, and at the front corner member 134' and rear corner member 134'' of the second sidewall 134 (see FIGS. 1 and 7), are preferably composed of rigid materials such as steel, aluminum, or similar structural materials to provide adequate support for the outer surfaces 196 extended therebetween, and to support second sidewall 134 during movement. The sidewalls 130, 134 can include horizontal cross-members 130'', 138'' extended between respective studs 130''', 130'''' to increase sidewall rigidity.

A middle partition 170 is incorporated in the semi-trailer 100 for separation of the trailer storage area into at least two storage compartments 110, 110' on the platform 116. By providing at least two storage compartments 110, 110', the semi-trailer 100 can be utilized for segregation of a plurality of crushed cars 192, 192', 192'' from other large recyclable materials 194 having a separate destination or requiring alternative recycling. The middle partition 170 is formed by a fixed partition wall 172 having a "u-shaped" cross-section when viewed from above, and having an interior cavity 178 opening outwardly and laterally toward the second, loading side 116'' of the platform 116. The fixed partition wall 172 includes a base portion originating against the floor of the platform 116, and at least one inspection door 170' on a rearward side of the fixed partition wall 172. The inspection door 170' provides access into the interior cavity 178 from the rear storage compartment 110' to allow maintenance to a middle lifting cylinder 180 if utilized and positioned within the cavity 178 (see FIGS. 6A and 6B).

Pivotably disposed laterally adjacent of the fixed partition wall 172 is a movable middle partition 174 having a triangular surface area forming a central body of the middle partition 174. One embodiment provides the middle partition 174 in planar alignment above the fixed partition wall 172 when the second sidewall 134 is in the closed position 140' (see FIG. 6A). The fixed partition wall 172 includes a first wall portion 172' attached to the first wall upper frame member 132 and having an upper surface angled downwardly to the platform second side 116'' (see FIG. 6B). The fixed partition wall 172 further includes a second wall portion 172'' aligned adjacent with the first portion 172' and also angled downwardly to the platform second side 116''. When in the closed position 140', a leading edge 138' of the base frame 138 portion of second sidewall 134 is positioned proximal to the lower sides of each first and second wall portion 172', 172'' (see FIG. 6A). When the movable middle partition 174 is raised into a cantilevered position above the fixed partition wall 172, side access is provided to the cavity 178 housing a middle lifting cylinder 180, if utilized. The fixed partition wall 172 and the movable middle partition 174 are preferably manufactured of steel or aluminum to provide a middle partition 170 contributing structural rigidity at about a mid-portion of the first sidewall 130 to support the movable middle partition 174 attached to second sidewall 134.

Figure 6A:
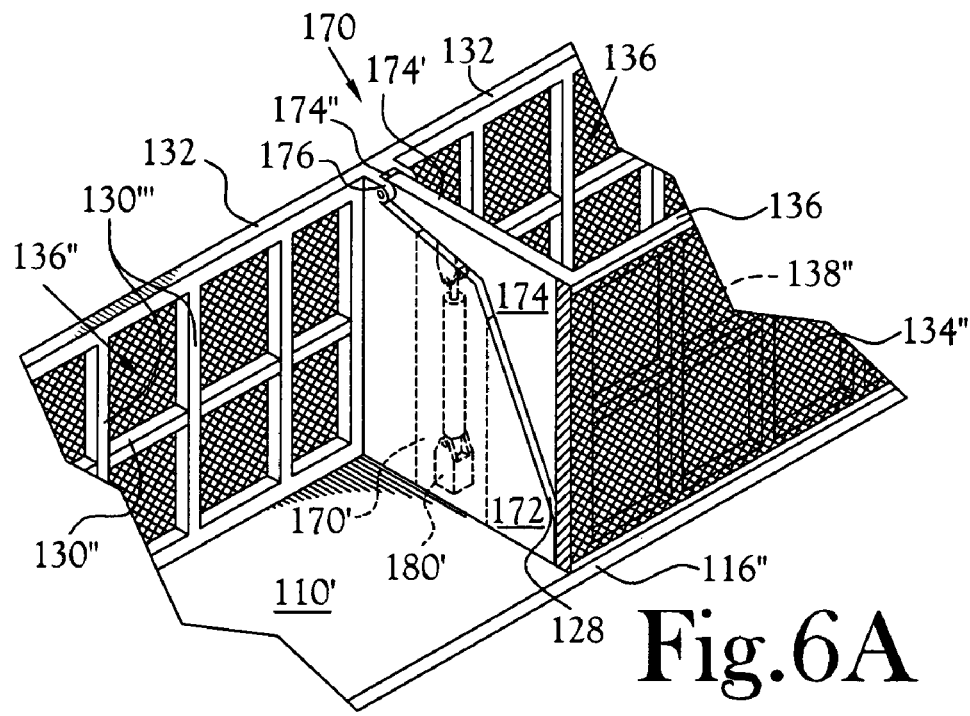
FIG. 6A is a cut-away view of a middle lifting mechanism enclosed within a middle partition wall and with the second sidewall in the closed position.
Figure 6B:
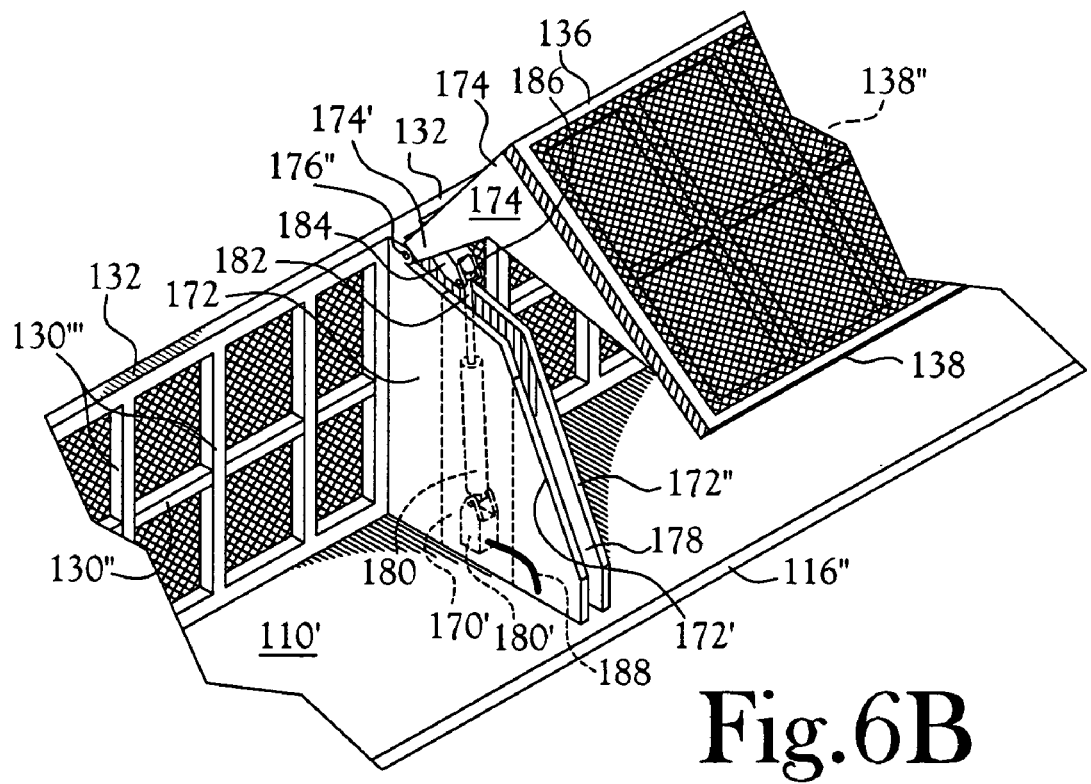
FIG. 6B is an exploded view of an upper connection joint and a middle piston extended to an elevated position.
Figure 7:
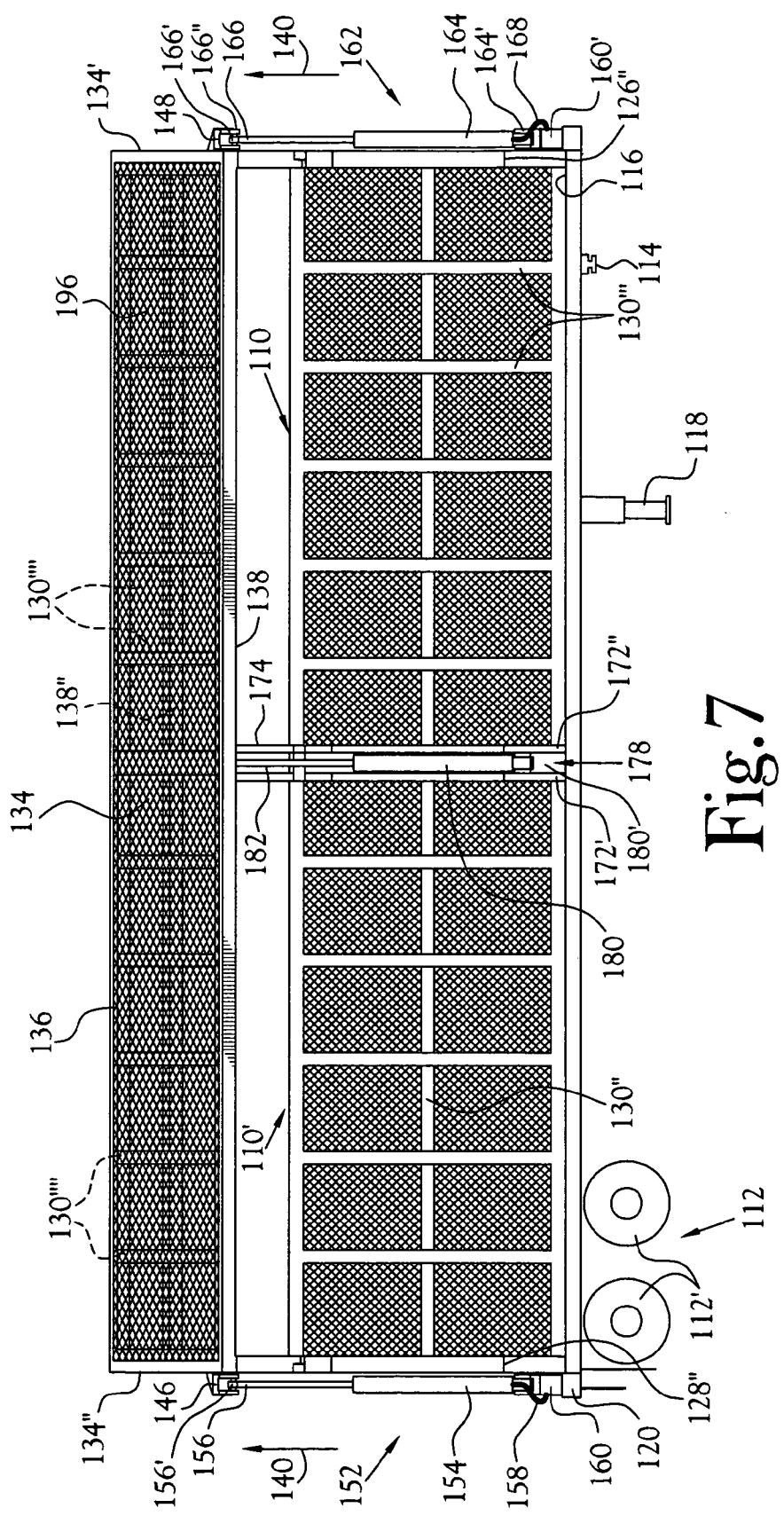
FIG. 7 is a side view of FIG. 2 with the second sidewall in the raised position, illustrating the middle partition wall having a lifting mechanism therein.

In order to provide additional lifting support to the lifting mechanism 150 for lifting the pivotable second sidewall 134, the movable middle partition 174 can be supported by an optional middle lifting cylinder 180 positioned in the cavity 178 (see FIGS. 6A and 6B). The middle lifting cylinder 180 includes a pivotable base 180', a piston rod 182 extendable from the lifting cylinder 180, an upper bracket 184 connected to a mid-portion of the movable middle partition 174, a connector pin 186 for attaching the bracket 184 to piston rod 182. In addition, sufficient linkages such as hydraulic hoses or pneumatic conduits 188 are provided to supply power, whether hydraulic fluid or pneumatic pressure, from the lifting cylinder 180 to a power supply (see FIG. 6B). The upper bracket 184 connects to the pivotable middle partition 174 which extends to a pivot end 174'' releasably connected to a pivot junction 176 formed with the upper corners of the fixed partition wall first and second portions 172', 172''. Pivot end 174'' is inserted in a tongue and groove configuration in junction 176 for movement of middle partition 174 relative to the fixed partition wall 172 when an operator actuates the lifting mechanism.

The upper frame 132 of the first sidewall 130 and the upper frame 136 of the second sidewall 134 provide a boundary for an open top 136' allowing top loading access to a significant interior volume of contained space. The two or more compartmental areas 110, 110' provided by the semi-trailer 100 is bounded by the length of the first sidewall 130, the front end wall 122 having the upper front support segment 142 aligned thereon, the rear end wall 124 having the upper rear support segment 144 aligned thereon, and the second sidewall 134 when disposed in the closed position 140'. The interior volume provided by the trailer 100 with the second sidewall 134 closed is in a range of between about 2,798 cubic feet to about 3,250 cubic feet, depending on a height of the walls surrounding the platform 116 extended between the first sidewall 130 and the second sidewall 134. A preferred configuration of the first sidewall 130 and second sidewall 134 when in the closed orientation enclosing the platform 116 includes a height extending above the platform 116 of about 8 feet 6 inches high for the first sidewall 130 and second sidewall 134 in the closed position 140', with inside widths of about 8 feet wide for the front and rear end walls 122, 124, and an inside length of about 41 feet 6 inches between the front and rear end walls 122, 124.

Figure 4:
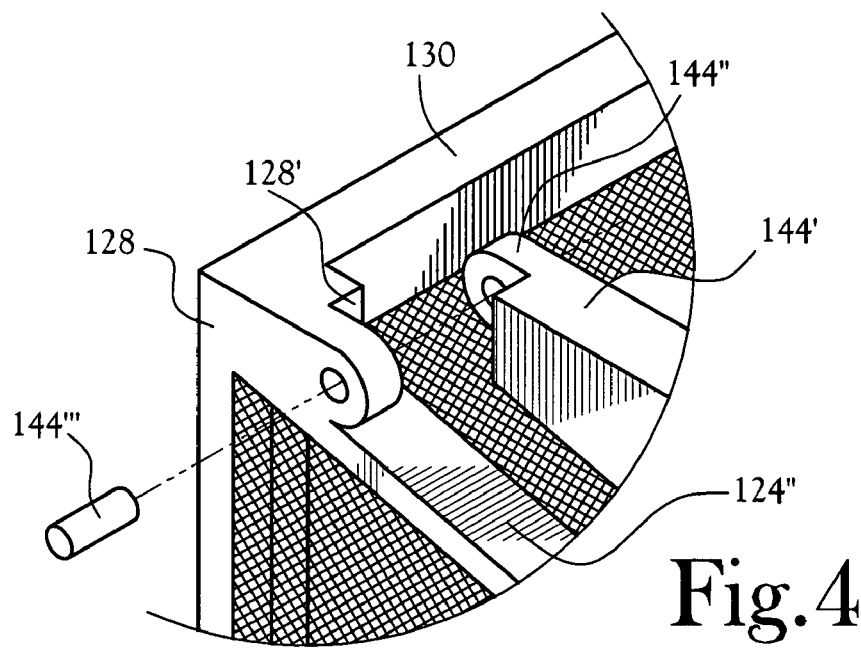
FIG. 4 is an exploded view of an upper corner pivot connection of FIG. 3B, illustrating an upper rear support segment providing for reciprocating movement of the second sidewall.

The front pivot connector end 142' of upper front support segment 142 is pivotably mounted by connection with at least one connector pin 142''' to an offset pivot junction 126' proximal of the upper front corner 126 of the front end wall 122 in the same manner as illustrated in FIG. 4. The rear pivot connector end 144'' of upper rear support member 144' is pivotably mounted by connection with at least one connector pin 144''' to an offset pivot junction 128' proximal of the upper rear corner 128 of the rear end wall 124 (see FIGS. 1 and 4). With the second sidewall 134 in the closed position 140', the upper front support member 142 is positioned adjacently above the front end wall 122, and the upper rear support member 144 is positioned adjacently above the rear end wall 124, with the combined height extending a sufficient height above the platform 116 to provide for enclosure of a plurality of stacked crushed vehicles 192, 192', 192'' up to a height of about eight feet, six inches above the platform 116. When pivoted in a clamshell movement to the raised position 140, the elevated second sidewall 134 provides an unobstructed length of the second side 116'' to allow rapid loading and stacking, and rapid unloading of crushed vehicles 192, 192', 192'' and other recyclable materials 194 on or off the platform 116.

The upper front support segment 142 and upper rear support segment 144 are shaped to have a substantially triangular width when viewed from a forward or rearward position of the rear or front ends of the semi-trailer 100. Each of the upper support member connector arms 142', 144' and 174' are generally rigid and include a reinforced central gusset member extended downwardly from each connector arms in a generally triangular shape. The central gusset member includes arcuate lower edges which align with and contact against an upper edge of respective front end wall 122 and rear end wall 124 when the second sidewall 134 is positioned in the closed position 140'. An upper corner of the front support segment 142, specifically the front pivot connector end 142', is pivotably attached proximal of the front upper corner 126 of the first sidewall 130 and the front end wall 122. The front upper corner 126 is disposed at a height of between about eight feet to about eight feet and six inches above the platform 116. The rear upper corner 128 is disposed at a height of between about eight feet to about eight feet and six inches above the platform 116, and includes rear pivot connector arm 144' as illustrated in FIGS. 3A and 3B. The second and lesser height of a second front end wall corner 126'' and a second rear end wall corner 128'' is between about a third or a half of the first height, providing end wall heights of between about four feet to about six feet above the platform 116. The lesser height of the end wall corners 126'', 128'' provide a lower threshold for lifting salvageable materials over either front or rear end wall proximal of the platform second side 116'' (see FIG. 2).

The lifting mechanism 150 provides for movement and positioning of the second sidewall 134 between closed 140' and open, elevated 140 positions. A preferred embodiment includes a pair of lifting systems positioned exterior of each front end wall 122 and rear end wall 124. At least one rear lifting system 152 includes a cylinder body 154 having a piston arm 156 extendable therefrom, and includes a cylinder base 154' pivotably mounted on the exterior surface of the rear end wall 124 at about a mid-portion of the base width of the rear end 120 of the platform 116 (see FIGS. 3A and 3B). The rear lifting system 152 includes a piston arm 156 extended to a distal end 156' that is pivotably connected utilizing a pin 156'' to an upper connection 146 fixed to the upper support member connector arm 144' of the upper rear support segment 144 (see FIGS. 3A, 3B and 5).

Figure 5:
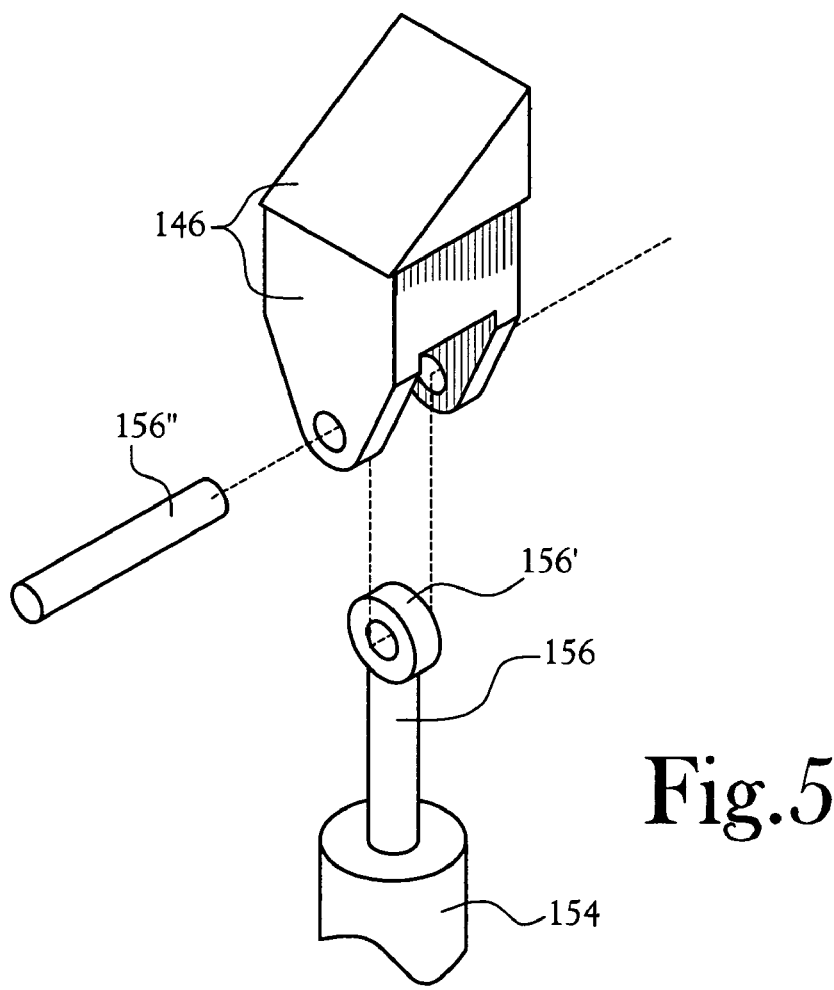
FIG. 5 is an exploded view of an upper rear connection joint of FIG. 3B, illustrating an extendable piston attachable to a mid-portion of the rear support segment of the second sidewall.

For one embodiment of the lifting mechanism 150, at least one front lifting system 162 (see FIG. 7) is included having a cylinder body 164 from which a piston arm 166 is extendable, and having a cylinder base 164' that is pivotably mounted on the exterior surface at about a mid-portion of the base width of the front end wall 122 in a configuration similar to that illustrated in FIGS. 3A, 3B and 5). The front lifting system 162 includes a piston arm 166 extended to a distal end 166' that is releasably connected by pivot pin 166'' to a front mid-wall connection 148 fixed to an upper mid-portion of front upper support segment 142. A second front cylinder and piston can be utilized (not shown) proximal of the first front hydraulic cylinder 164 and piston 166 for synchronous movement to the raised position 140 of the front upper support segment 142 of a heavily weighted upper frame 136 and second side wall 134. The rear and front lifting systems 152, 162 are supplied with hydraulic power by hydraulic linkages providing pressurized hydraulic fluid transmitted by a plurality of hydraulic hoses 158, 168 in fluid connection with a hydraulic power system and at least one motor 160 of approximately six horsepower power output and positioned proximal of the platform rear end 120. An auxiliary motor 160' can be positioned on the platform front end wall 122 (see FIG. 6). The plurality of hydraulic hoses 158, 168, 188 are detachably connectable to hydraulic linkages such as hydraulic hoses and conduits (not shown) that are extendable from a front portion of the semi-trailer 100 for detachably connecting to a tractor-truck hydraulic power system typically powered by the engine of a tractor-truck vehicle having an adequate power output to tow the semi-trailer 100 over significant distances.

A hydraulic power and motor control mechanism of conventional design (not shown) is provided such as hand-operated lever controls in communication with the respective lifting cylinders, in order to provide operator control of the hydraulic pressure supplied to respective rear, front and middle hydraulic cylinders 154, 164, 180 thereby controlling the synchronous raising of the second sidewall 134 from the closed position 140' to the open position 140 above the platform 116. A lock-out electrical or mechanical control mechanism is provided as part of the hydraulic power and motor control mechanism to negate the raising of the second sidewall 134 while the semi-trailer 100 is being moved, and to negate the lowering of the second sidewall 134 during loading and unloading of the platform 116. Upon elevation of the second sidewall 134 to the open position 140, a plurality of vehicles 192, 192', 192'', and/or other recyclable materials are readily loaded and stacked on the platform 116 by a forklift 190 (see FIG. 2), or rolled and positioned onto the platform 116 from an adjacent loading ramp (not shown). When moved to the closed position 140', the second sidewall 134 contains the stacked vehicles 192, 192', 192'', and/or other recyclable materials for safe transport over roads in compliance with U.S. Department of Transportation regulations.

Rapid loading and stacking of salvageable vehicles onto the platform 116 is provided by a forklift 190 when the second sidewall 134 is elevated by the lifting mechanism 150 from the closed position 140' to the open position 140 above the platform 116. When a forklift 190 is not available for loading, a plurality of salvageable vehicles and/or compacted recyclable materials are readily lowered by an overhead crane (not shown) through either of the open tops 136', 136" and into the contained space bounded by the first sidewall 130, the front end wall 122 having the upper front support segment 142 above, the closed second sidewall 134, and the rear end wall 124 having the upper rear support segment 144 above. An additional benefit of the semi-trailer 100 having the second sidewall 134 mounted for clamshell movement is the option of loading additional recyclable materials along with a plurality of crushed vehicles 192, 192', 192" from the platform second side 116" when the sidewall is raised 140. Alternatively, If the trailer 100 is not filled to its preferred twenty ton load capacity, the second sidewall 134 can be positioned in the closed position 140' and loading continued for any remaining unoccupied compartmental units 110, 110' by lowering from overhead a plurality of various compacted and/or non-compacted recyclable materials through either of the open tops 136', 136".

Additional features of the platform 116 and multi-wheeled undercarriage 112 includes a support jacking device 118' positioned underneath the front end 118. The jacking device 118' is temporarily extendable during stationary loading and unloading of the platform 116 in order to maintain a level platform. The front support jacking device 118' is retractable under the front end 118 of the platform 116 during towed transport of the wheeled undercarriage 112 in a conventional manner. A trailer hitch 114 is disposed under the platform front end 118 (see FIG. 6), or a similar coupling device is utilized as known to those skilled in the art regarding towed semi-trailers. The trailer hitch 114 is releasably connectable to a docking unit on a tractor-truck vehicle (not shown) for towing the semi-trailer 100 over public roads for loading and unloading at appropriate facilities of crushed vehicles and/or salvageable recyclable materials.

An additional embodiment for the second sidewall 134 and upper frame 136 includes a retractable canvas tarp or similar flexible synthetic cover that is extendable from an upper position above front support segment 142 to cover the length and width of the open tops 136', 136" to minimize loss of debris during transport of crushed vehicles and/or other scrap materials from within the semi-trailer 100. Those skilled in the art will recognize that a semi-trailer 100 having one sidewall 134 mounted for clamshell movement can be utilized for transport of a plurality of salvageable materials and/or for transport of a plurality of large objects having recycle value and which require side-loading by a forklift 190 with the sidewall 134 in an elevated position 140. A unique feature of the semi-trailer 100 having one sidewall 134 mounted for clamshell movement includes the option of loading materials from an overhead position into either of the open tops 136', 136" when the sidewall 134 is in a closed position 140'. Also, no chains or straps are required to retain the materials in the semi-trailer 100. Rapid loading and unloading of materials is feasible whether the sidewall 134 is raised 140 or in the closed position 140', and no manipulation of chains or straps is required as is typical of prior transport trucks. One skilled in the art will recognize that either sidewall is mountable for clamshell movement above the platform 116. An additional embodiment includes a second side having a lower sidewall portion separate from an upwardly pivoting second sidewall. The second side lower sidewall can be hydraulicly pivotable along a base edge aligned with the platform second side 116", for movement of the lower sidewall to an inclined position (not shown) and forming a ramp extendable to a loading dock or the ground from the second side 116" to facilitate side access loading and unloading without departing from the spirit and scope of the present invention.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. A semi-trailer for contained transport of salvageable materials, comprising:
   a platform supported by a wheeled undercarriage for towed transport, said platform having a first sidewall extended along a first side and having a second sidewall extended along a second side of said platform, each first and second sidewall having upper portions extended upwardly to bound an open top having a sufficient width to receive salvageable materials therein;
   front and rear end walls extended between said first and second sidewalls;
   a partition wall spaced apart between said front and rear end walls, said partition wall being upwardly oriented for separation of said platform into a forward compartment and a rearward compartment;
   said second sidewall is mounted for clamshell movement between a closed position aligned along said second side and a raised position above said platform, said second sidewall including front and rear upper support segments extending laterally adjacent of respective front and rear end walls, each upper support segment having front and rear connecting ends pivotably mounted proximal of respective front and rear upper portions of said first sidewall; and
   a lifting mechanism for movement of said second sidewall to said raised position above said platform;
   whereby side access to said platform is provided for loading and unloading of salvageable materials with said second sidewall in said raised position and said second sidewall is pivotable to said closed position for containment of salvageable materials during towed transport.

2. The semi-trailer of claim 1 wherein said lifting mechanism including front and rear cylinders having at least one reciprocating front and rear piston slidably extendable from each respective cylinder, said front and rear cylinders having pivotable base ends positioned exterior of respective midportions of each front and rear end wall, each extendable piston having a piston end configured for pivotable connection to a mid-junction of respective front and rear upper support segments of said second sidewall, each cylinder being supplied by a hydraulic linkage extending from a hydraulic power system positioned on said platform, said hydraulic power system and respective front and rear cylinders being controlled by an operator.

3. The semi-trailer of claim 1 wherein said second sidewall including:
   an upper support frame extended lengthwise between respective upper front and upper rear portions of said second sidewall;
   a lower frame edge extended lengthwise between respective lower front and rear portions of said second sidewall, said lower frame edge is disposed to sealingly engage against said platform second side when said second sidewall is in said closed position;

a middle upper support segment extending laterally adjacent of said partition wall and having a connecting end of sufficient length to pivotably mount proximal of a mid-portion of said first sidewall;

said front upper support segment extended laterally adjacent of said front end wall for traversal of said platform when said second sidewall is in said closed position;

said rear upper support segment extended laterally adjacently of said rear end wall for traversal of said platform when said second sidewall is in said closed position; and said open top being bounded by said front upper support segment, said upper support frame of said second sidewall, said rear upper support segment, and said upper portion of said first sidewall when said second sidewall is in said closed position;

whereby when said second sidewall is in said closed position, said platform provides loading and unloading of salvageable materials from overhead through said open top.

4. The semi-trailer of claim 1 wherein said second sidewall further including:

a middle upper support segment extended parallel above said partition wall extended across said platform between said front and rear end walls, said middle upper support segment including:

a substantially triangular central body composed of a rigid material supported by a rigid triangular middle frame;

said middle upper support segment extending to said connecting end pivotably mounted to said first sidewall; and a middle angled base member extending from said middle upper support segment to said lower base frame of said second sidewall, said middle angled base member is disposed in alignment above said partition wall when said second sidewall is in said closed position.

5. The semi-trailer of claim 2 wherein said lifting mechanism further including a middle cylinder having a hydraulically actuated piston slidably extendable therefrom in synchronous movement with said front and rear pistons for pivoting said second sidewall, said middle cylinder positioned within said partition wall.

6. The semi-trailer of claim 3 wherein said lifting mechanism further including:

a front hydraulic cylinder having a front piston reciprocatingly extendable therefrom, said front hydraulic cylinder is pivotably connected to said platform exterior of a mid-portion of said front end wall, said front piston having a distal end extendable to connect to a mid-portion of said front upper support segment;

a rear hydraulic cylinder having a rear piston reciprocatingly extendable therefrom, said rear hydraulic cylinder is pivotably connected to said platform exterior of a mid-portion of said rear end wall, said rear piston having a distal end extendable to connect to a mid-portion of said rear upper support segment;

a hydraulic power system and motor disposed on said platform, said hydraulic power system having a plurality of hydraulic hoses detachably extended to respective front and rear hydraulic cylinders, said hydraulic power system and motor provides sufficient hydraulic pressure transmitted through said plurality of hydraulic linkages for synchronous actuation and extension of respective front and rear pistons for synchronous movement of said front and rear upper support segments and said second sidewall; and a control mechanism in communication with said hydraulic power system and motor, said control mechanism is activated by an operator for controlled synchronous movement of said front, middle and rear upper support segments and said second sidewall relative to said platform between said raised position and said closed position.

7. The semi-trailer of claim 3 wherein said second sidewall further including:

said front upper support segment having a substantially triangular central body composed of a mesh material allowing air flow therethrough, said mesh material being supported by a rigid triangular first frame including:

said front upper support segment;

a lower front junction joined to said lower frame of said second sidewall; and an angled front support member extending between said front upper support segment and said lower frame of said second sidewall, said angled front support member disposed in alignment with said front end wall when said second sidewall is in said closed position; and said rear upper support segment having a substantially triangular central body composed of said mesh material allowing air flow therethrough, said mesh material being supported by a rigid triangular second frame including:

said rear upper support segment;

a lower rear junction joined to said lower frame of said second sidewall; and an angled rear support member extending between said rear upper support segment and said lower frame of said second sidewall, said angled rear support member disposed in alignment with said rear end wall when said second sidewall is in said closed position;

whereby said second sidewall moved to said raised position provides each triangular central body of respective front and rear upper support segments to be cantilevered above said front and rear end walls thereby providing unobstructed side access to said forward and rearward compartments.

8. The semi-trailer of claim 1 wherein said platform supported by said wheeled undercarriage including a front support disposed in a retracted position under said platform front end wall, said front support is extendable to rest on a supporting surface for level positioning of said platform during loading and unloading, said front support is retractable to said retracted position under said platform front end wall during towed transport of said platform and wheeled undercarriage when coupled with a tractor-trailer vehicle.

9. The semi-trailer of claim 5 wherein said partition wall including a forward and a rear wall segment having an internal cavity therein, said forward and rear wall segment surrounding said middle cylinder and piston extendable therefrom, said internal cavity being accessible from a rear removable panel in said rear wall segments, said removable panel being removable to provide an opening to said internal cavity having said middle cylinder and piston therein.

10. The semi-trailer of claim 1, further comprising said first sidewall, said front and rear end walls, and said second sidewall being constructed of a plurality of spaced-apart studs extending between aligned in upright orientation along respective upper and lower portions of each one of said first sidewall, said front and rear end walls, and said second sidewall, said plurality of spaced-apart studs having outboard surfaces for support thereon of a generally continuous exterior surface layer composed of a mesh material allowing air flow therethrough.

11. A semi-trailer for transport of salvageable materials, comprising:

a platform supported by a wheeled undercarriage for towed transport, said platform having a first sidewall extended parallel of a first side of said platform, and having front and rear end walls extended laterally from respective front and rear ends of said first sidewall to a second side of said platform;

a second sidewall pivotably mounted to upper portions of said first sidewall, said second sidewall reciprocatingly moved between a closed position adjacent to said platform second side and a raised position disposed above said platform, said second sidewall including:

a front upper support segment aligned adjacently parallel with said front end wall when said second sidewall is in said closed position;

a rear upper support segment aligned adjacently parallel with said rear end wall when said second sidewall is in said closed position;

said front and rear upper support segments extend a width of said platform to pivotably connect at respective front and rear upper portions of said first sidewall, said first sidewall and front and rear upper support segments of said second sidewall having upper portions bounding an open top having a sufficient width and length for positioning salvageable materials therein; and a lifting mechanism for reciprocating movement of said second sidewall to said raised position above said platform; and a partition wall positioned parallel to and between said front and rear end walls, said partition wall separating said platform into a forward compartment and a rearward compartment;

whereby said second sidewall moved by said lifting mechanism to said raised position provides unobstructed side assess to said platform for positioning salvageable materials in either of said forward and rearward compartments, and said second sidewall moved to said closed position provides containment of the salvageable materials during towed transport.

12. The semi-trailer of claim 11 wherein said second sidewall including:

an upper support frame extended between an upper front portion and an upper rear portion of said second sidewall, said upper support frame supported by said front and rear upper support segments for clamshell movement between said closed position and said raised position;

a lower frame extended from a lower front corner and a lower rear corner of said second sidewall, said lower frame providing a base edge of sufficient horizontal length to sealingly engage against said platform second side when said second sidewall is in said closed position;

said front upper support segment is extended laterally from said upper support frame for traversal of said platform adjacent to said front end wall when said second sidewall is in said closed position, said front upper support segment is extended the width of said platform to pivotably mount to said front upper portion of said first sidewall; and said rear upper support segment extended laterally from said upper support frame for traversal of said platform adjacent to said rear end wall when said second sidewall is in said closed position, said rear upper support segment is extended the width of said platform to pivotably mount to said rear upper portion of said first sidewall;

whereby said second sidewall composed of said upper support frame, said lower frame, said front upper support segment and said rear upper support segment is reciprocatingly moved by said lifting mechanism between said closed position and said raised position.

13. The semi-trailer of claim 11 wherein said lifting mechanism including:

a first and second hydraulic cylinder positioned exterior of respective mid-portions of said front and rear end walls;

said first hydraulic cylinder having a first hydraulic piston extendable therefrom, said first hydraulic cylinder is pivotably attachable at a base end to said front end wall proximal of said platform, said first hydraulic piston having a first piston distal end pivotably attachable proximal of a front mid-portion of said front upper support segment;

said second hydraulic cylinder having a second hydraulic piston extendable therefrom, said second hydraulic cylinder is pivotably attachable at a base end to said rear end wall proximal of said platform, said second hydraulic piston having a second piston distal end pivotably attachable proximal of a rear mid-portion of said rear upper support segment; and a hydraulic system positioned on said platform and including a hydraulic power generator and a plurality of conduit linkages in fluid connection between said hydraulic power generator and respective first and second hydraulic cylinders;

whereby said hydraulic system being controlled by an operator for synchronized movement of said first and second piston distal ends for movement of said front and rear upper support segments and said second sidewall between said closed position and said raised position thereby providing unobstructed side access for positioning salvageable materials in either forward and rearward compartments on said platform.

14. The semi-trailer of claim 12 wherein second sidewall further including:

said front upper support segment including a substantially triangular width having a first central gusset member and a first lower support edge aligned with said front end wall when said second sidewall is in said closed position;

said rear upper support segment including a substantially triangular width having a second central gusset member and a second lower support edge aligned with said rear end wall when said second sidewall is in said closed position;

a middle upper support segment extending laterally from said second sidewall to be pivotably joined proximal of said first sidewall, said middle upper support segment including a substantially triangular width, a third central gusset member, and a third lower support edge aligned with said partition wall when said second sidewall is in said closed position; and each central gusset in respective front, rear and middle upper segments are composed of a mesh material allowing air flow therethrough.

15. The semi-trailer of claim 14 wherein said second sidewall further including:
- said front upper support segment having a front pivot connector end extended to releasably connect in pivoting relationship proximal of said front end wall junction with said upper front portion of said first sidewall;
- said rear upper support segment having a rear pivot connector end extended to be releasably connected in pivoting relationship proximal of said rear end wall junction with said rear upper portion of said first sidewall; and
- said middle upper support segment having a middle pivot connection extended to be releasably connected in pivoting relationship proximal of said partition wall junction with said first sidewall.

16. The semi-trailer of claim 11 wherein said platform is supported by said wheeled undercarriage further including a front support disposed under said platform front end wall, said front support is extendable to a supporting surface from maintenance of said platform in level configuration during loading and unloading, said front support is retractable during towed transport of said platform and wheeled undercarriage when coupled to a tractor-trailer vehicle for towed transport.

17. The semi-trailer of claim 11, further comprising said first sidewall and said second sidewall being constructed upper and lower frame members having a plurality of spaced-apart studs extending between each respective upper and lower frame members, each of said first sidewall and said second sidewall having a generally continuous exterior surface composed of a mesh material allowing air flow therethrough, said mesh material being supported by said plurality of spaced-apart studs extended between each respective upper and lower frame members.

18. A semi-trailer for contained transport of salvageable materials, comprising:
- a platform supported by a wheeled undercarriage for towed transport, said platform having an adequate width between first and second sides to receive a plurality of salvageable materials thereon, said platform including:
- a first sidewall disposed to extend upward along said platform first side;
- front and rear end walls extended upwardly from said platform and forming respective front and rear corner junctions with said first sidewall;
- a second sidewall mounted for clamshell movement between a closed position aligned along said second side and a raised position above said platform, said second sidewall including front and rear upper support segments extending laterally adjacent of respective front and rear end walls, each upper support segment having front and rear connecting ends pivotably mounted proximal of respective upper portions of said front and rear corner junctions with said first sidewall;
- a partition wall positioned to traverse said platform between said front and rear end walls, said partition wall separating said platform into a first compartment and a second compartment; and
- a lifting mechanism for reciprocating clamshell movement of said second sidewall between said closed position and said raised position;
- whereby said platform is loaded and unloaded through said open top when said second sidewall is in said closed position, and said platform is loaded and unloaded utilizing side access along said second side of said platform when said second sidewall is in said raised position above said platform.

19. The semi-trailer of claim 18 wherein said second sidewall including:
- an upper support frame extended lengthwise between an upper front corner and an upper rear corner of said second sidewall when moved to said closed position adjacent said platform second side, said upper support frame supported for clamshell movement from said closed position adjacent said platform second side to said raised position above said platform;
- a lower frame of sufficient width to extend from said upper support frame to a base edge having sufficient length to sealingly engage against said platform second side when said second sidewall is in said closed position;
- a front upper support segment extended perpendicular from said upper front corner of said upper support frame for traversal of said platform above said front end wall, said front upper support segment extended to pivotably mount to said front corner junction of said first sidewall at an elevated height above said platform; and
- a rear upper support segment extended perpendicular from said upper rear corner of said upper support frame for traversal of said platform above said rear end wall, said rear upper support segment extended to pivotably mount to said rear corner junction of said first sidewall at an elevated height above said platform;
- whereby said second sidewall composed of said upper support frame, said lower frame, said front upper support segment and said rear upper support segment is moved in reciprocating clamshell movement between said closed position and said raised position.

20. The semi-trailer of claim 18 wherein said lifting mechanism including:
- a first pneumatic cylinder having a base pivotably connected to an exterior portion of said front end wall and having a first pneumatically activated piston extended to attach at a pivoting connection disposed on a mid-portion of said first support arm of said second sidewall;
- a second pneumatic cylinder having a base pivotably connected to an exterior portion of said rear end wall and having a second pneumatically actuated piston extended to attach at a pivoting connection disposed on a mid-portion of said second support arm of said second sidewall; and
- a pneumatic pressure generator and a plurality of a pneumatic linkages positioned to connect between said pneumatic pressure generator and respective first and second pneumatic cylinders;
- whereby said pneumatic pressure generator being controllable by an operator for synchronized movement of said first and second pneumatically actuated pistons for movement of said upper front and rear support arms and said second sidewall from said closed position to said raised position thereby providing unobstructed second side access for loading and unloading salvageable materials on and off of said platform.

21. The semi-trailer of claim 18 wherein said second sidewall further including:

said front upper support segment including a substantially triangular width in cross-section and having a reinforced central gusset member and a first lower support edge disposed in alignment above said front end wall when said second sidewall is moved to said closed position;

said rear upper support segment including a substantially triangular width in cross-section and having a reinforced central gusset member and a second lower support edge disposed in alignment above said rear end wall when said second sidewall is moved to said closed position;

said front upper support segment having a front pivot connection end releasably connected by a first pivot member to said front corner junction of said first sidewall at said elevated height above said platform; and said rear upper support segment having a rear pivot connection end releasably connected by a second pivot member to said rear corner junction of said first sidewall at said elevated height above said platform.

22. The semi-trailer of claim 18 wherein said platform is supported by said wheeled undercarriage including a front support disposed under said front end wall, said front support is extendable in length to contact a supporting surface thereby providing substantially level orientation of said platform during loading and unloading, whereby said front support is retractable during towed transport of said platform and wheeled undercarriage when coupled to a tractor-trailer vehicle.

23. The semi-trailer of claim 18, further comprising said first sidewall, said front and rear end walls, and said second sidewall being constructed upper and lower frame members having a plurality of spaced-apart studs extending between each respective upper and lower frame members, each of said first sidewall, said front and rear end walls, and said second sidewall having a generally continuous exterior surface composed of a mesh material allowing air flow therethrough, said mesh material being supported by said plurality of spaced-apart studs extended between respective upper and lower frame members.

24. The semi-trailer of claim 20 wherein said partition wall includes a forward and a rear wall segment having an internal cavity therebetween, said forward and rear wall segments enclosing said internal cavity in which a third pneumatic cylinder is disposed, said third pneumatic cylinder having a third piston extendable therefrom for connection to said middle upper support segment of said second sidewall, said forward and rear wall segments each having a removable panel pivotably positioned for periodic access to said third pneumatic cylinder within said internal cavity.

* * * * *